(12) United States Patent
Inose

(10) Patent No.: US 9,116,640 B2
(45) Date of Patent: Aug. 25, 2015

(54) IMAGE PROCESSING APPARATUS, DISPLAY METHOD, AND STORAGE MEDIUM

(75) Inventor: Koji Inose, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 565 days.

(21) Appl. No.: 13/044,372

(22) Filed: Mar. 9, 2011

(65) Prior Publication Data

US 2011/0222117 A1    Sep. 15, 2011

(30) Foreign Application Priority Data

Mar. 11, 2010    (JP) .................... 2010-054470

(51) Int. Cl.
*G06F 3/12*    (2006.01)
*H04N 1/00*    (2006.01)

(52) U.S. Cl.
CPC .......... *G06F 3/1204* (2013.01); *G06F 3/1271* (2013.01); *G06F 3/1287* (2013.01); *H04N 1/0048* (2013.01); *H04N 1/00464* (2013.01); *H04N 1/00474* (2013.01); *H04N 1/00477* (2013.01); *H04N 1/00482* (2013.01); *G06F 3/121* (2013.01); *G06F 3/1267* (2013.01)

(58) Field of Classification Search
CPC ..... G06F 3/1204; G06F 3/121; G06F 3/1267; G06F 3/1271; G06F 3/1287; H04N 1/00464; H04N 1/00474; H04N 1/00477; H04N 1/0048
USPC ................................... 358/1.15, 1.1
See application file for complete search history.

(56) References Cited

U.S. PATENT DOCUMENTS

| | | | |
|---|---|---|---|
| 5,896,502 A * | 4/1999 | Shieh et al. ................. 709/224 |
| 6,408,350 B1 * | 6/2002 | Kawamura et al. ............. 710/62 |
| 2001/0005837 A1 * | 6/2001 | Kojo ............................. 705/51 |
| 2006/0012835 A1 | 1/2006 | Shimizu | |
| 2009/0268229 A1 * | 10/2009 | Richardson et al. ......... 358/1.15 |

FOREIGN PATENT DOCUMENTS

JP    2006-031465 A    2/2006

* cited by examiner

*Primary Examiner* — Martin Mushambo
(74) *Attorney, Agent, or Firm* — Canon USA, Inc. IP Division

(57) ABSTRACT

An image processing apparatus can control display on the web browser to display on an operation screen a name of data whose format corresponds to a format of data acquired in a reading unit or a format of printable data in a print unit, among the data pieces acquired from and managed by an external service.

6 Claims, 13 Drawing Sheets

FIG. 4

```
<html xmlns=" http://www.w3.org/1999/xhtml" >
<head>
  <title></title>
  <link rel=" stylesheet" href=" img/StyleSheet.css" />
</head>
<body>
  <table width=" 100%" >
    <tr>
      <td>
        <img src=" img/pdf.png" />PDFFile1
      </td>
    </tr>
    <tr>
      <td>
        <img src=" img/pdf.png" />PDFFile2
      </td>
    </tr>
  </table>
</body>
</html>
```

```
<?xml version=" 1.0" encoding=" UTF-16" ?>
<entry gd:etag=" "XxQaV01YHyt7lmBr"" >
 <title>PDFFile1</title>
</entry>
<entry gd:etag=" "XxQaV0VVESt7lmBa"" >
 <title>PDFFile2</title>
</entry>
```

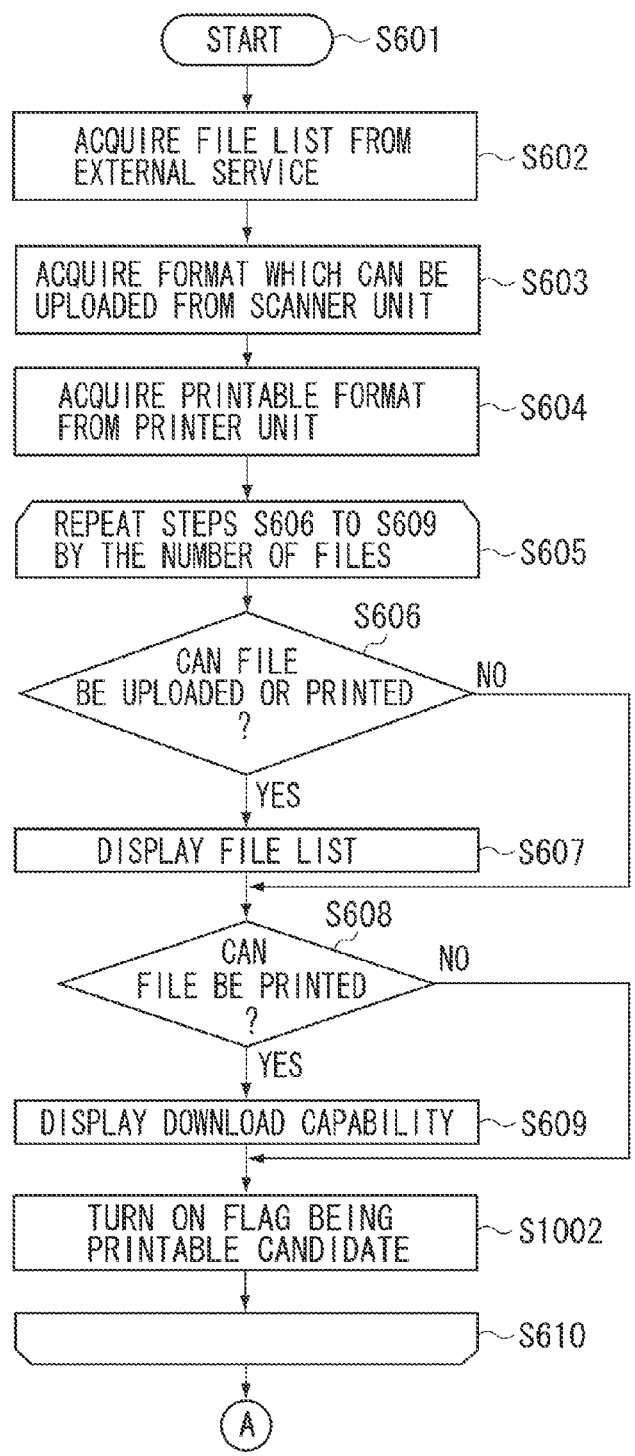

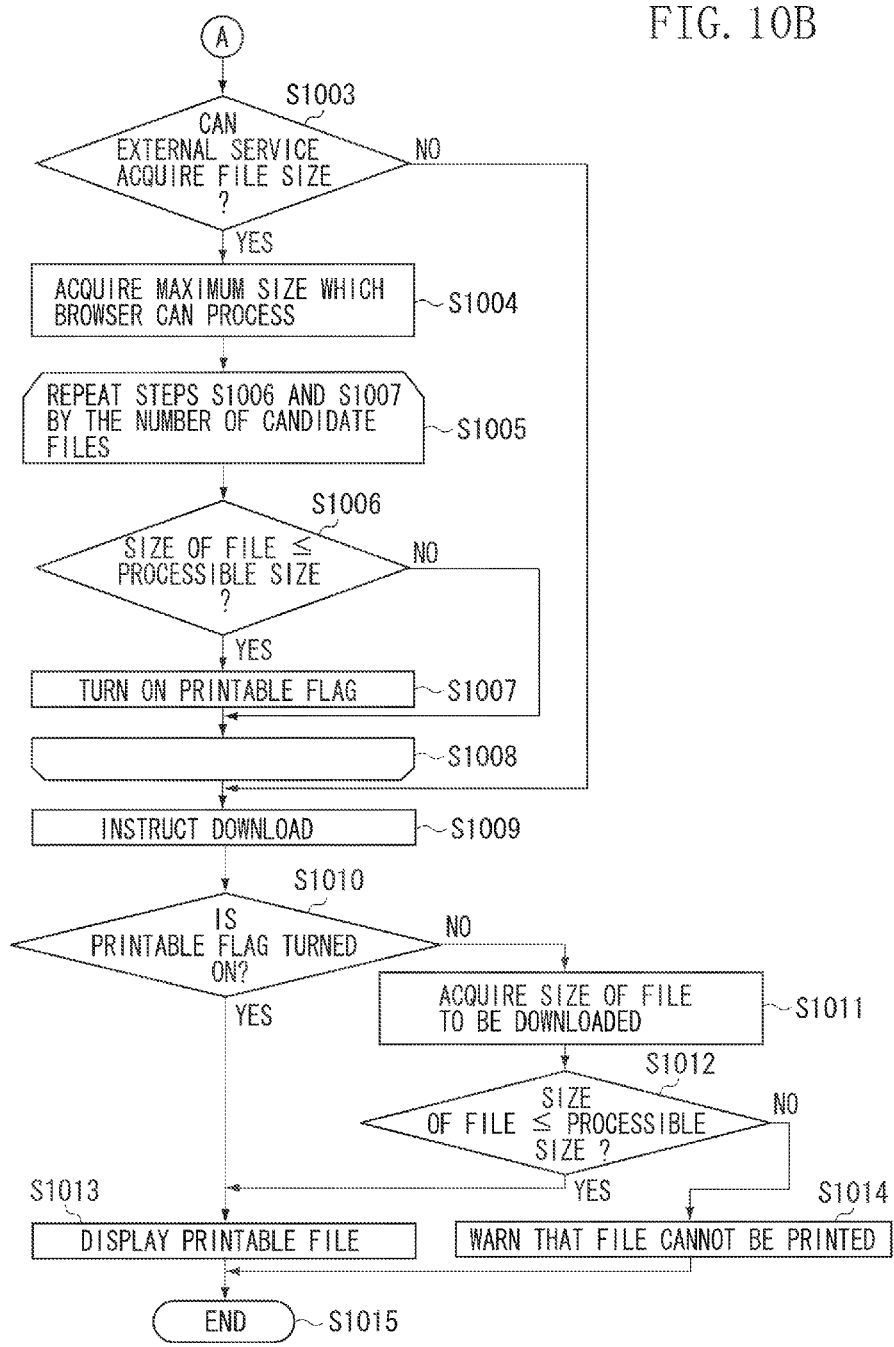

IMAGE PROCESSING APPARATUS, DISPLAY METHOD, AND STORAGE MEDIUM

BACKGROUND OF THE INVENTION

1. Field of the Invention

The present invention relates to an image processing apparatus, a display method, and a storage medium.

2. Description of the Related Art

Conventionally, it has been known that an image processing apparatus is connected to an external server on a network to use services provided by the external server. According to the method discussed in Japanese Patent Application Laid-Open No. 2006-31465, for example, it has been known that an image processing apparatus selects printable documents from among documents stored in a document management server and displays a list thereof.

It has also been known that, when the image processing apparatus uses an external service, the external server is provided with a web server function and a web browser is used as a means of connecting the image processing apparatus with the external server. In this case, the web browser of the image processing apparatus requests an operation screen from the external server. An application on the external server transmits hypertext markup language (HTML) data for displaying the operation screen in response to the request from the image processing apparatus. The web browser of the image processing apparatus analyzes the received HTML data to display the operation screen based on the description of the received HTML data.

SUMMARY OF THE INVENTION

According to an aspect of the present invention, an apparatus having a reading unit configured to read a document to acquire data and a print unit configured to execute print includes an execution unit configured to execute a service for communicating with an external service which manages data to be uploaded in an external apparatus, and a web browser configured to display an operation screen on an operation unit, wherein the execution unit controls display on the web browser to display on the operation screen a name of data whose format corresponds to a format of the data acquired in the reading unit or a format of printable data in the print unit, among the data pieces acquired from and managed by the external service.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of screen information (HTML data).

FIG. 5 illustrates an example of file information (Extensible Markup Language (XML) data).

FIG. 10 (including FIG. 10A and FIG. 10B) is a flow chart illustrating processing in which a web application according to a third exemplary embodiment generates an operation screen to be transmitted to a web browser based on information which can be acquired from an external service.

DESCRIPTION OF THE EMBODIMENTS

Various exemplary embodiments, features, and aspects of the invention will be described in detail below with reference to the drawings.

If an image processing apparatus is connected with an external server using a web browser and displays a list of files stored in the external server on the browser, the following problems can be caused.

For example, it is generally known that a multifunction peripheral (MFP) with a scanner function in addition to a printing function can transmit a file to an external server. Files to be displayed using the web browser of such an MFP may include both of a printable file and a transmitted file, and an opportunity to display a list of both files at the same time is also assumed. However, the conventional technique can display only a list of printable files but cannot confirm transmitted files.

On the other hand, it is generally known that files acquired from the external server can be displayed as a list without any special selection. In this case, a file with a format which neither can be printed by the MFP nor can be transmitted using the scanner function may be displayed. This causes a problem of user-friendliness when a user selects his/her desired file through the web browser.

The present invention relates to display of data with a format which can be printed or transmitted using the scanner function in displaying data stored in an external apparatus on a browser.

Figure 1:
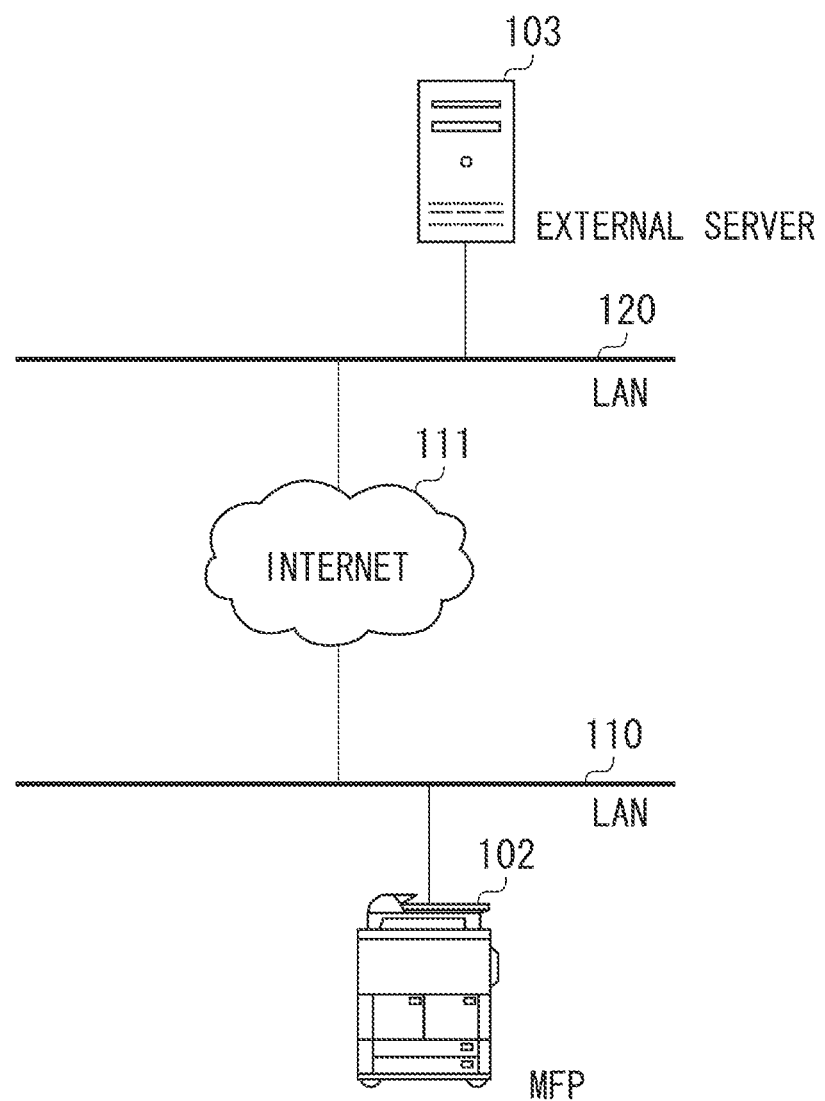
FIG. 1 illustrates an example of a system configuration of an image processing system.

A first exemplary embodiment is described below. FIG. 1 illustrates an example of a system configuration of an image processing system. An MFP 102 is connected to the Internet 111 via a local area network (LAN) 110. An external server 103 which provides a file management service described below is connected to the Internet 111 via a LAN 120. This configuration enables the MFP 102 to communicate with the external server 103 and use the file management service provided by the external server 103. The external server 103 is an example of an external apparatus.

FIG. 1 illustrates an example in which a single external server 103 provides the file management service. However, as another form of the external server 103, a plurality of virtual machines may be started in server groups each configured with a plurality of servers to perform distributed processing. The MFP 102 is an example of the image processing apparatus.

Figure 2:
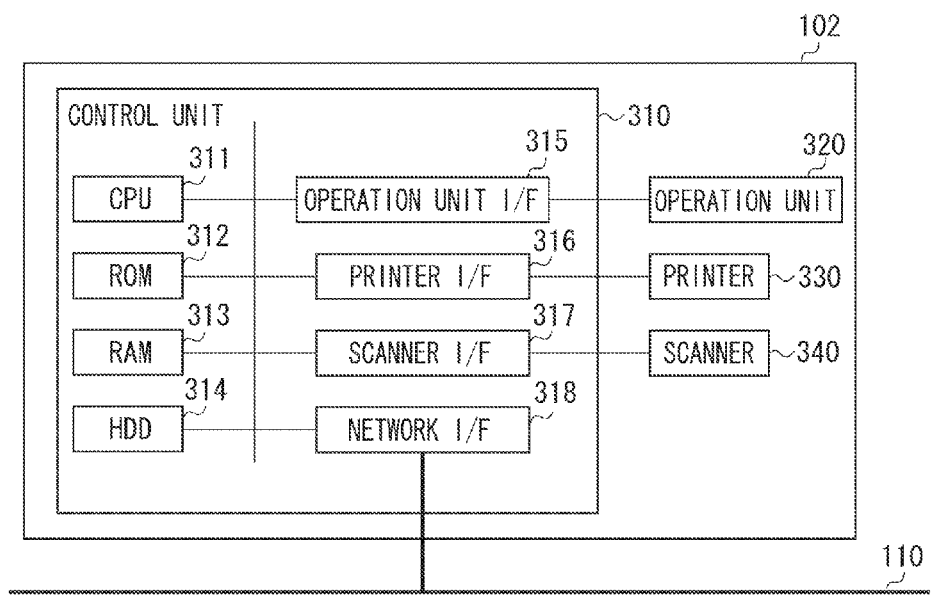
FIG. 2 illustrates an example of a hardware configuration of a multifunction peripheral (MFP).

FIG. 2 illustrates an example of a hardware configuration of the MFP 102. A control unit 310 including a central processing unit (CPU) 311 controls the operation of the entire MFP 102. The CPU 311 reads a program stored in a read-only memory (ROM) 312 to perform various types of control such as reading control and transmitting control. A random access memory (RAM) 313 is used as a temporary storage area such as a main memory and a work area of the CPU 311.

A hard disk drive (HDD) 314 stores image data and various programs therein. An operation unit interface (I/F) 315 connects an operation unit 320 to the control unit 310. The operation unit 320 is provided with a liquid crystal display unit with a touch panel function and a keyboard. The MFP 102 includes a web browser function and a web application function. The CPU 311 analyzes hypertext markup language (HTML) data received from the web application using the web browser function and control the display of the operation screen on the liquid crystal display unit of the operation unit 320 based on the description of the HTML data.

A printer I/F 316 connects a printer 330 to the control unit 310. Image data to be printed by the printer 330 is transferred from the control unit 310 via the printer I/F 316 and printed on a recording medium by the printer 330. The printer 330 is an example of a printing unit.

A scanner I/F 317 used for reading various physical documents such as a paper medium as various data such as image data or PDF data connects a scanner 340 to the control unit 310. The scanner 340 reads an image on the document to generate image data and inputs the image data to the control unit 310 via the scanner I/F 317. The scanner 340 is an example of a reading unit.

A network I/F 318 connects the control unit 310 (MFP 102) to the LAN 110. The network I/F 318 performs communication control for transferring and receiving image data or various pieces of information to or from the external server 103 via the LAN 110.

Figure 3:
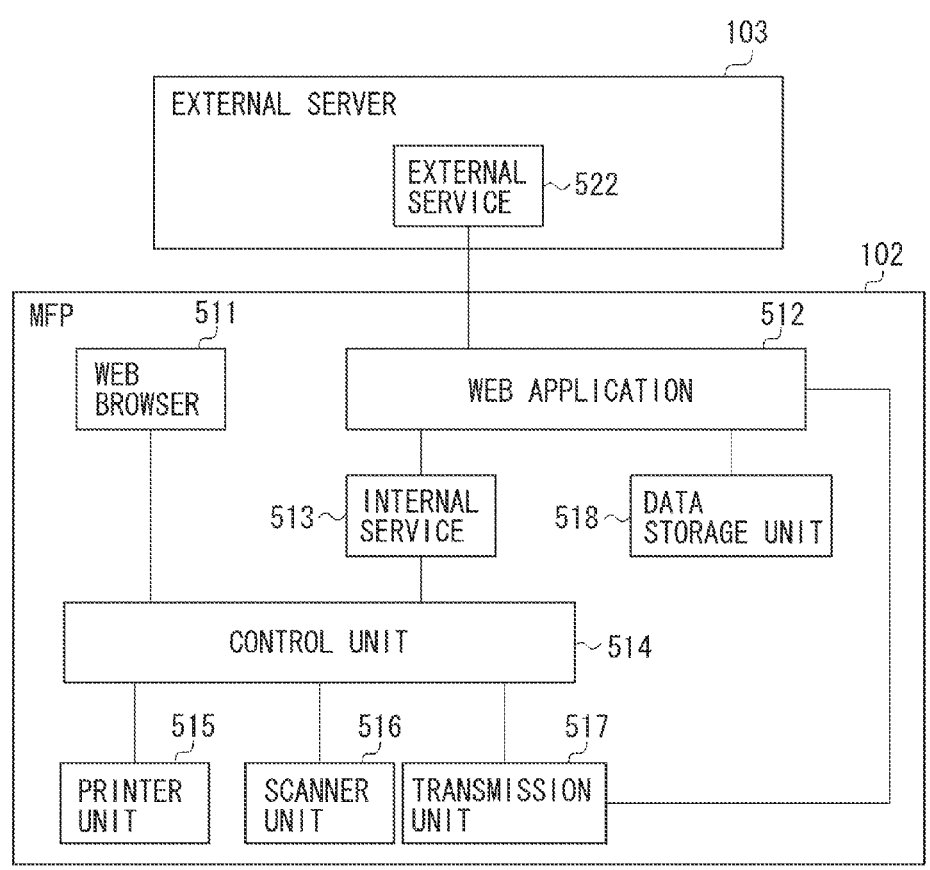
FIG. 3 illustrates an example of a software configuration of an image processing apparatus.

FIG. 3 illustrates an example of a software configuration of the image processing apparatus. Each function shown in the MFP 102 can be realized by the CPU 311 executing programs.

The MFP 102 includes a web browser 511, a web application 512, an internal service 513, a control unit 514, a printer unit 515, a scanner unit 516, a transmission unit 517, and a data storage unit 518. The printer unit 515 interfaces the control unit 514 with the printer 330. The scanner unit 516 interfaces the control unit 514 with the scanner 340.

The web browser 511 communicates with the web application 512 according to a hypertext transfer protocol (HTTP) protocol. More specifically, the web browser 511 transmits a request message for requesting an operation screen displayed on the web browser 511 or a file printed by the printer unit 515 to the web application 512. The web browser 511 receives a response message transmitted from the web application 512. The web browser 511 analyzes the response message received from the web application 512. The response message includes the HTML data. The web browser 511 analyzes the response message to display the operation screen on the operation unit 320.

The web application 512 receives the request message from the web browser 511 and transmits the response message responding to the operation screen to the web browser 511. Further, the web application 512 transmits the request message for requesting an external service 522 to provide a service thereto via the Internet 111 and receives the response message transmitted from the external service 522. If the response message includes a file, the web application 512 temporarily stores the file in the data storage unit 518.

The web application 512 transmits the request message requesting the internal service 513 to provide a service thereto. Further, the web application 512 receives the response message transmitted from the internal service 513. Furthermore, the web application 512 receives image data (file) transmitted from the transmission unit 517.

By providing the MFP 102 with the web application 512, the operation screen related to the file management service provided by the external server 103 can be displayed on the web browser 511.

More specifically, the service information (or information about files managed by the external server 103) transmitted by the external service 522 is received by the web application 512. The web application 512 with a web server function generates screen information (HTML data) for causing the web browser 511 to display the operation screen based on the received service information and transmits the screen information to the web browser 511.

FIG. 4 illustrates an example of the screen information (HTML data) 201. The screen information 201 generated by the web application 512 can be analyzed by the web browser 511, so that the web browser 511 receiving the screen information can display the operation screen.

The web application 512 is an example of an execution unit for executing a service for communicating with the external service 522.

The internal service 513 receives a request massage for requesting the provision of a service from the web application 512. The internal service 513 analyzes the received message and instructs the control unit 514 to generate a job for executing designated processing. The internal service 513 receives a notification of an execution status of the generated job from the control unit 514. The internal service 513 generates a response message for responding to the notified execution status of the job and transmits the response message to the web application 512.

The control unit 514 receives an instruction from the web browser 511 or the internal service 513 and generates the job for executing the designated processing. More specifically, the control unit 514 generates a print job designated by the web browser 511 based on image data and print settings stored in the data storage unit 518. The control unit 514 generates a scan transmission job designated by the internal service 513 based on a scan transmission setting. The control unit 514 processes the print job to generate image data for printing and transfers the image data to the printer unit 515. The control unit 514 processes the scan transmission job and instructs the scanner unit 516 to read a document.

The scanner unit 516 receives the image data from the scanner 340 and then transmits the image data to the control unit 514. The control unit 514 converts the image data received from the scanner unit 340 into a file in a specific format and instructs the transmission unit 517 to transmit the converted file to the web application 512.

The external server 103 includes the external service 522. The file management service is an example of the service provided by the external service 522. The external service 522 provides the web application 512 in the MFP 102 with the above file management service according to the HTTP protocol. In this case, the external service 522 transmits the service information in which the file information managed by the external server 103 is described in the Extensible Markup Language (XML) format to the web application 512. FIG. 5 illustrates an example of the file information (XML data) 401.

Figure 6:
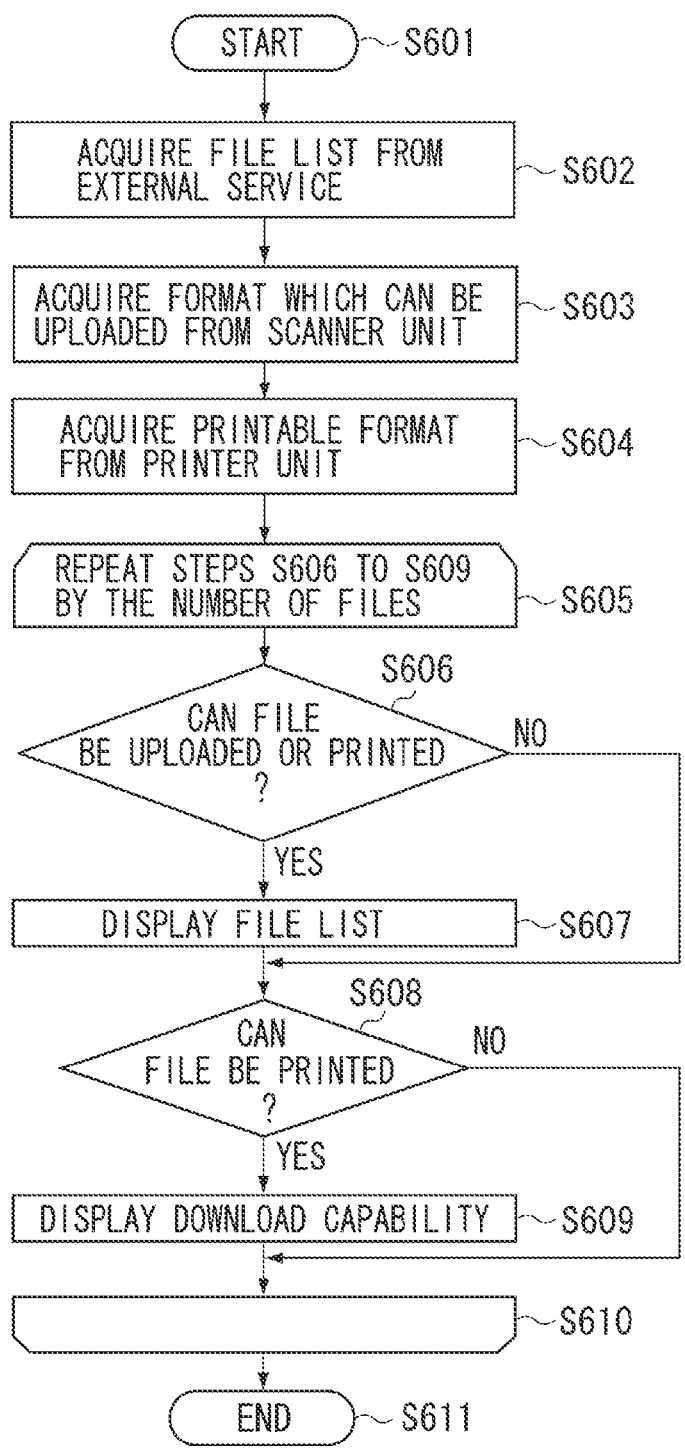
FIG. 6 is a flow chart illustrating processing in which a web application according to a first exemplary embodiment generates an operation screen to be transmitted to a web browser based on information which can be acquired from an external service.

FIG. 6 is a flow chart illustrating processing in which the web application 512 in the first exemplary embodiment generates an operation screen to be transmitted to the web browser 511 based on the information which can be acquired from the external service 522. The processing described below is the one that is executed by the web application 512 which is realized by the CPU 311 executing the programs stored in the HDD 314.

In step S601, the web application 512 starts processing in FIG. 6. In step S602, the web application 512 acquires a list of files (file list) managed by the external service 522. The processing in step S602 is an example of data acquisition processing.

In step S603, the web application 512 acquires a type of a format (which can be uploaded) into which the image data generated by reading the image is converted from the scanner unit 516 via the internal service 513 and the control unit 514. The type of the format is typically discriminated by an extension of a file. In the present exemplary embodiment, any determination method may be used. The processing in step S603 is an example of format acquisition processing.

In step S604, the web application 512 acquires the type of the format of image data (file) which can be printed by the printer unit 515 from the printer unit 515 via the internal service 513 and the control unit 514. The type of the format is typically discriminated by an extension of a file. In the present exemplary embodiment, any determination method may be used. The processing in step S604 is an example of printable data format acquisition processing. It is indifferent to the order of steps S603 and S604.

Step S605 is a starting process for a repeating process illustrated in steps S606 to S609. Step S610 is an ending process of the repeating process.

In step S606, the web application 512 determines whether any file acquired in step S602 matches the format acquired in steps S603 or S604 (whether the file corresponds to the format). If the web application 512 determines that the file matches (corresponds to) the format (YES in step S606), the processing proceeds to step S607.

In step S607, the web application 512 includes a file name into response data to be transmitted to the web browser 511. If the web application 512 determines that the file does not match the format (NO in step S606), the processing proceeds to step S608.

In step S608, the web application 512 determines whether a file to be processed matches the format acquired in step S604. If the web application 512 determines that the file matches the format (YES in step S608), the processing proceeds to step S609.

In step S609, the web application 512 associates a download button with the file name and includes the download button into the response data to be transmitted to the web browser 511. The download button refers to a button for a user issuing an instruction to acquire the data of the file with the name associated therewith from the external service 522 and temporarily storing the data in the data storage unit 518. In step S611, the web application 512 ends the processing illustrated in FIG. 6.

Figure 7:
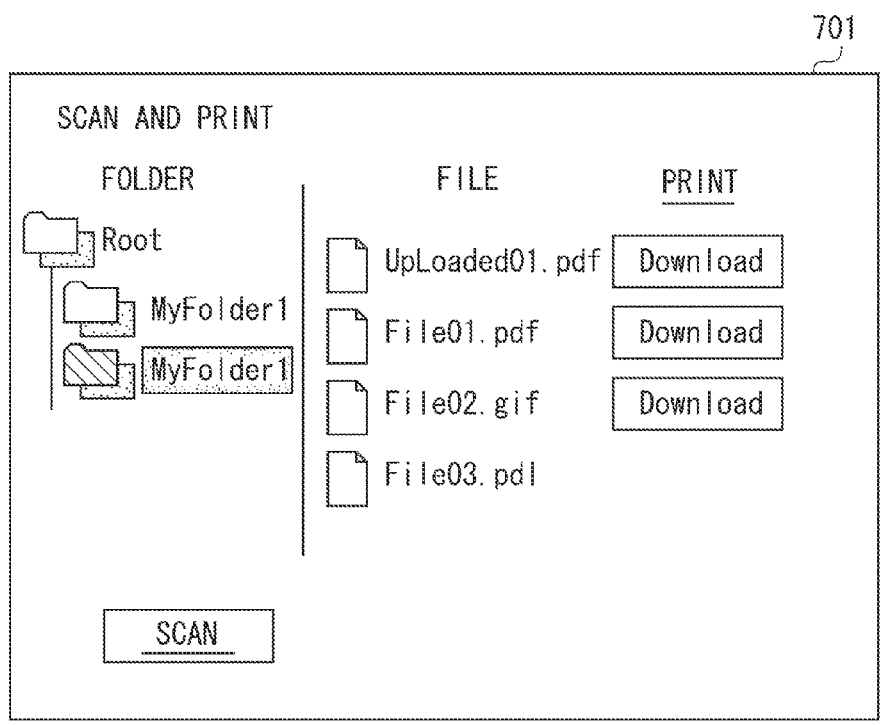
FIG. 7 illustrates an example of an operation screen which is generated by the web application at the time of ending the repeating process from step S605 to step S610, and then received and displayed by the web browser.

FIG. 7 illustrates an example of an operation screen 701 which is generated by the web application 512 at the time of ending the repeating process from step S605 to step S610, and then received and displayed by the web browser 511. The operating screen 701 indicates that files with the names of "Uploaded01.pdf", "File01.pdf", and "File02.gif" can be temporarily stored.

In FIG. 7, "Uploaded01.pdf" is associated with the download button. "File01.pdf" is also associated with the download button. "File02.gif" is also associated with the download button.

For example, when the control unit 514 receives a notification that the download button illustrated in FIG. 7 is pressed from the web browser 511, the control unit 514 acquires information for identifying a file such as a print name associated with the download button from the web browser 511. The control unit 514 instructs the transmission unit 517 to transmit a download request for the file identified by the information to the web application 512.

Upon receiving the instruction, the web application 512 downloads the file identified by the information from the external service 522 and temporarily stores the file in the data storage unit 518. For example, the control unit 514 received information indicating that the file is downloaded from the web application 512 via the internal service 513 controls the download button to be changed to a print button indicating "printable."

For example, when the control unit 514 receives a notification from the web browser 511 that the scan button illustrated in FIG. 7 is pressed, the control unit 514 generates a scan transmission job based on the scan transmission setting designated by the internal service 513. Further, the control unit 514 processes the scan transmission job and instructs the scanner unit 516 to read a document. The scanner unit 516 receives image data from the scanner 340 and then transmits the image data to the control unit 514.

The control unit 514 converts the image data received from the scanner unit 340 into a file in a specific format and instructs the transmission unit 517 to transmit the converted file to the web application 512. Upon receiving the converted file, the web application 512 transmits the converted file to the external unit 522, for example. The web application 512 transmits the file to the external unit 522 and then, if the processing illustrated in the flow chart in FIG. 6 is executed again, the web application 512 performs scan to display the screen to which the file registered in the external service 522 is added on the web browser 511.

A second exemplary embodiment is described below. In the second exemplary embodiment, the points different from the first exemplary embodiment are described.

Figure 8:
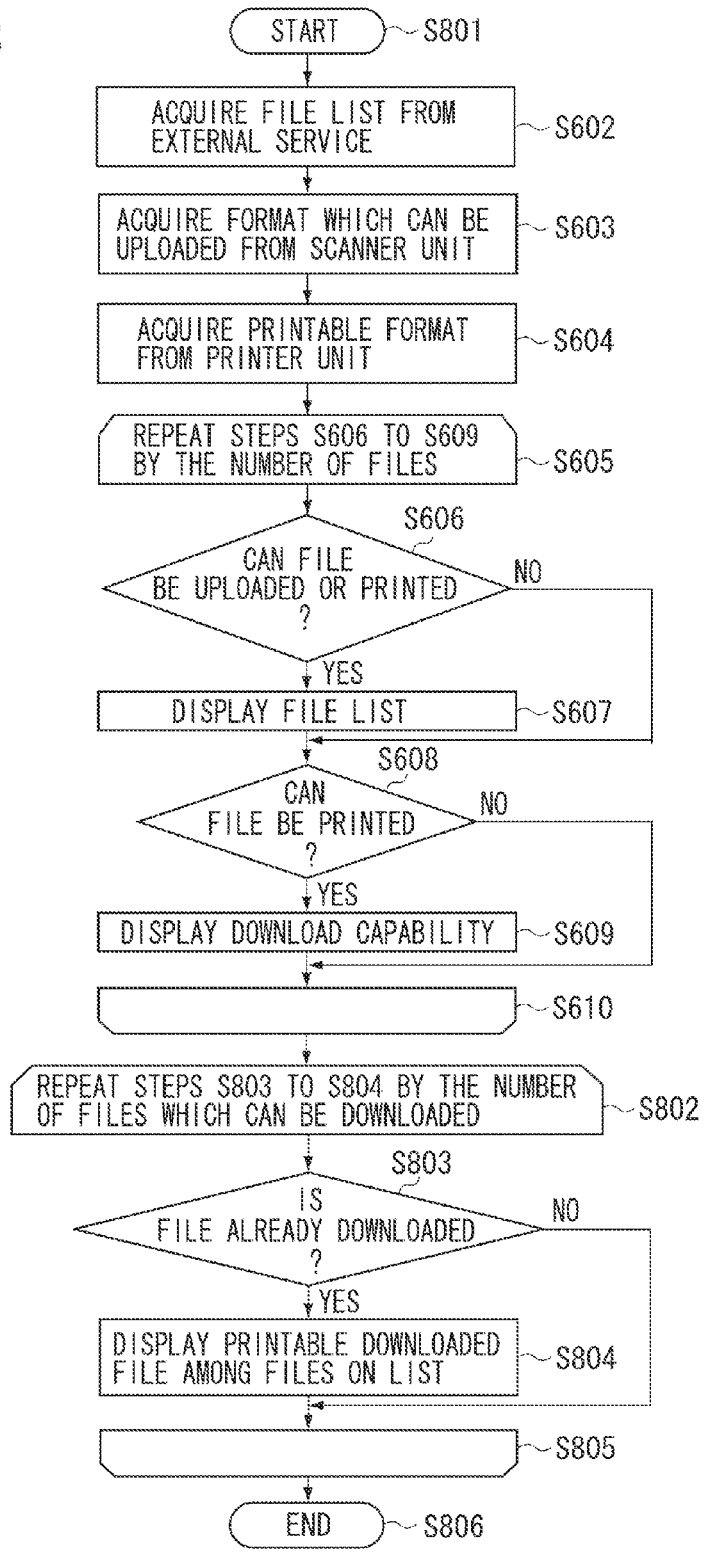
FIG. 8 is a flow chart illustrating processing in which a web application according to a second exemplary embodiment generates an operation screen to be transmitted to a web browser based on information which can be acquired from an external service.

FIG. 8 is a flow chart illustrating the processing in which the web application 512 in the second exemplary embodiment generates an operation screen to be transmitted to the web browser 511 based on the information which can be acquired from the external service 522. The processing described below is the one that is executed by the web application 512 which is realized by the CPU 311 executing the programs stored in the HDD 314. In FIG. 8, the processing similar to that in FIG. 6 is provided with the same reference numerals.

In step S801, the web application 512 starts the processing illustrated in FIG. 8. Step S802 is a starting process for a repeating process illustrated in steps S803 and S804. Step S805 is an ending process of the repeating process.

In step S803, the web application 512 determines whether a file having the same name as the file determined to match the format in step S608 is stored in the data storage unit 518. If the web application 512 determines that the file is already stored (YES in step S803), the processing proceeds to step S804.

In step S804, the web application 512 converts the download button into a print button for a user issuing an instruction to print of data. If the web application 512 determines that the file does not match the format (NO in step S803), the processing proceeds to step S805. In step S806, the web application 512 ends the processing illustrated in FIG. 8.

Figure 9:
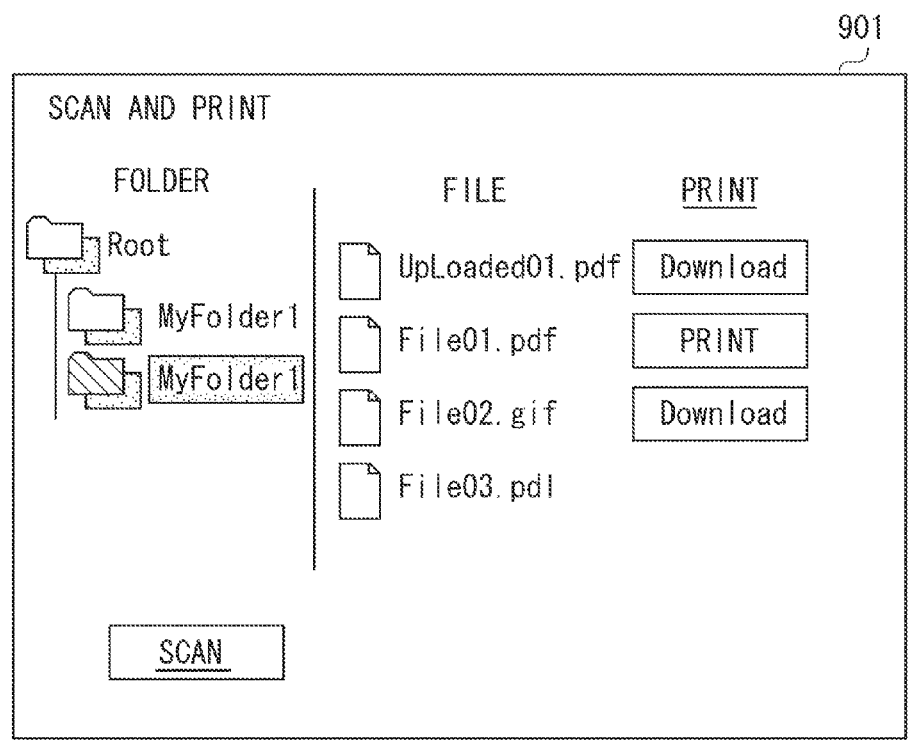
FIG. 9 illustrates an example of an operation screen which is generated by the web application at the time of ending the repeating process from step S802 to step S805, and then received and displayed by the web browser.

FIG. 9 illustrates an example of a screen 901 that is the operation screen generated by the web application 512 at the time of ending the repeating process from step S802 to step S805 and then received and displayed by the web browser 511. The screen 901 in FIG. 9 shows that only the file with a name of "File01.pdf" among the files with names of "Uploaded01.pdf", "File01.pdf", and "File02.gif" is temporarily stored and in a printable state.

In FIG. 9, "Uploaded01.pdf" is associated with the download button. "File01.pdf" is associated with the print button. "File02.gif" is associated with the download button.

For example, when the control unit 514 notified by the web browser 511 that the print button illustrated in FIG. 9 is pressed, the control unit 514 acquires the image data and print settings of the file with the name associated with the print button from the data storage unit 518. The control unit 514 generates a print job based on the acquired image data and print settings, processes the print job to generate image data for printing and transfers the image data to the printer unit 515.

A third exemplary embodiment is described below. In the third exemplary embodiment, the points different from the first and second exemplary embodiments are described.

FIG. 10 is a flow chart illustrating processing in which the web application 512 in the third exemplary embodiment generates an operation screen to be transmitted to the web browser 511 based on the information which can be acquired from the external service 522. The processing described below is the one that is executed by the web application 512 which is realized by the CPU 311 executing the programs stored in the HDD 314. In FIG. 10, the processing similar to that in FIG. 6 is provided with the same reference numerals.

In step S1001, the web application 512 starts the processing illustrated in FIG. 10. In step S1002, the web application 512 sets a flag indicating that the file determined to be true in step S608 is a printable candidate valid and records the file inside the web application 512.

In step S1003, the web application 512 inquires the external service 522 of whether the size of the file managed by the external service 522 can be acquired and determines whether the size of the file can be acquired based on the inquiry result. The file size is an example of an attribute for determining whether a file can be printed and does not limit the type of the attribute. If the web application 512 determines that the size of the file can be acquired (YES in step S1003), the processing proceeds to step S1004. If the web application 512 determines that the size of the file cannot be acquired (NO in step S1003), the processing proceeds to step S1009.

In step S1004, the web application 512 acquires the maximum size of a print executable file from the web browser 511 via the internal service 513 and the control unit 514. The web browser 511 is an example of a module for handling a file to be printed, for example, for displaying contents of the file before the printer unit 515 executes printing.

Step S1005 is a starting process for a repeating process illustrated in steps S1006 and S1007. Step S1008 is an ending process of the repeating process.

In step S1006, the web application 512 determines whether the size of the file determined to be printable in step S608 is equal to or smaller than the value acquired in step S1004. If the web application 512 determines that the size is equal to or smaller than the value acquired in step S1004 (YES in step S1006), the processing proceeds to step S1007. If the web application 512 determines that the size is greater than the value acquired in step S1004 (NO in step S1006), the processing proceeds to step S1008.

In step S1007, the web application 512 sets a flag, which indicates that the file whose size is determined to be equal to or smaller than the value acquired in step S1004 can be temporarily stored, valid and records the file inside the web application 512.

In step S1009, the web application 512 detects that the user presses the download button on the operation screen via the web browser 511, the control unit 514, or the internal service 513.

In step S1010, the web application 512 determines whether the file designated in step S1009 can be printed from the result in step S1007. If the web application 512 determines that the file can be printed (YES in step S1010), the processing proceeds to step S1013. If the web application 512 determines that the file cannot be printed (NO in step S1010), the processing proceeds to step S1011.

In step S1013, the web application 512 generates an operation screen enabling the user to issue an instruction to print the corresponding file as the response data to be transmitted to the web browser 511.

In step S1011, the web application 512 acquires the size of the file instructed to be temporarily stored in step S1009 and temporarily stored in the data storage unit 518.

In step S1012, the web application 512 determines whether the value acquired in step S1011 is equal to or smaller than the value acquired in step S1004. If the web application 512 determines that the value acquired in step S1011 is equal to or smaller than the value acquired in step S1004 (YES in step S1012), the processing proceeds to step S1013. If the web application 512 determines that the value acquired in step S1011 is greater than the value acquired in step S1004 (NO in step S1012), the processing proceeds to step S1014.

In step S1014, the web application 512 generates a message that the file cannot be printed and a relevant operation screen as the response data to be transmitted to the web browser 511. In step S1015, the web application 512 ends the processing illustrated in FIG. 10.

Figure 11:
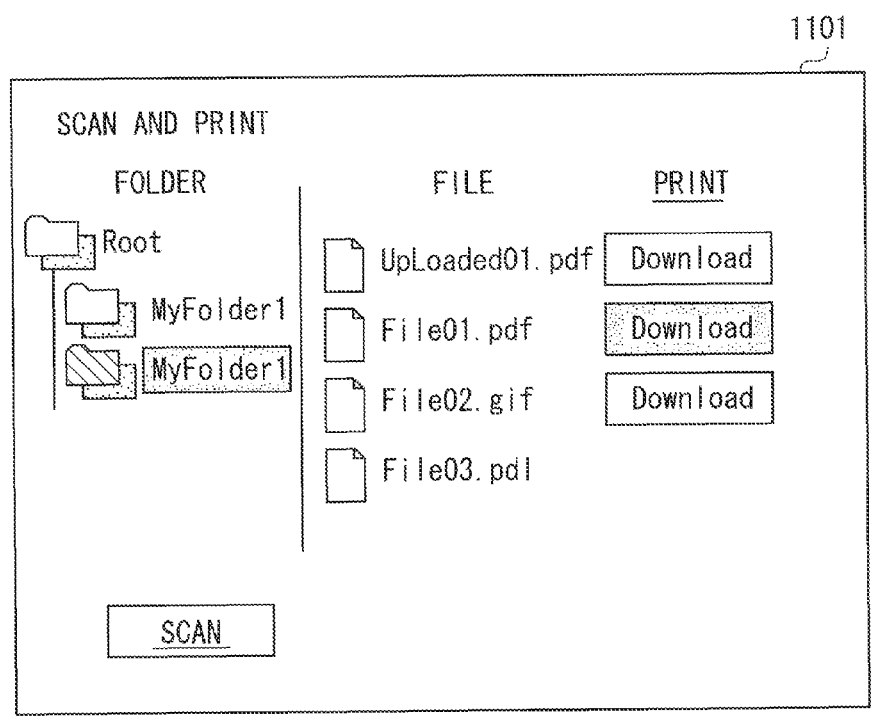
FIG. 11 illustrates an example of an operation screen immediately after when an instruction to temporarily store "File01.pdf" is received from a user in step S1009 in a state that the web browser has received and displayed an operation screen generated in step S609.

FIG. 11 illustrates an operation screen 1101 immediately after the instruction to temporarily store "File01.pdf" is received from the user in step S1009 when the operation screen generated in step S609 is received and displayed by the web browser 511.

Figure 12:
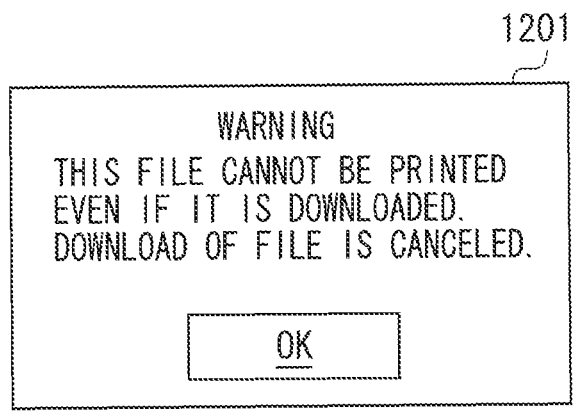
FIG. 12 illustrates an example of an operation screen which is generated in step S1014, and then received and displayed by the web browser.

FIG. 12 illustrates an example of the operation screen which is generated in step S1014 and then received and displayed by the web browser 511. A screen 1201 displays a message that temporary storage of the file into the data storage unit 518 cannot be executed (a file cannot be printed if the file is downloaded).

According to the above described exemplary embodiments, only data with a format which can be printed or transmitted using the scanner function can be displayed when data stored in the external server is displayed on the browser.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-054470 filed Mar. 11, 2010, which is hereby incorporated by reference herein in its entirety.

What is claimed is:

1. An apparatus having a reading unit configured to read a document to acquire data and a print unit configured to execute print, the apparatus comprising:
an execution unit configured to execute a service for communicating with an external service which manages data to be uploaded in an external apparatus; and
a web browser configured to display an operation screen on an operation unit, the operation screen being generated by a web application,
wherein the execution unit controls display on the web browser to display on the operation screen a name of data whose format matches a format of the data acquired in the reading unit or a format of printable data in the print unit, wherein the format determines whether the data can be uploaded from the external apparatus,
wherein the web application determines whether the format of the name of data matches the format of the data acquired in the reading unit or the format of printable data in the print unit,
wherein the execution unit performs control to display on the operation screen a download button for a user to instruct download of the data from the external apparatus by associating with a name of the data whose format matches to that of the printable data, among the data pieces whose names are displayed on the operation screen, and
wherein the execution unit receives an instruction to download data according to a user's operation of the download button and, if a size of data with the name associated with the download button exceeds a size of data which can be printed from the web browser, the execution unit performs control to display on the operation screen that print cannot be executed.

2. The apparatus according to claim 1, wherein the execution unit performs control to display on the operation screen a print button for a user to instruct printing of the data by associating a name of the data whose format matches that of the printable data and which has been downloaded from the external apparatus, among the data pieces whose names are displayed on the operation screen.

3. A method for displaying executed by an apparatus having a reading unit configured to read a document to acquire data and a print unit configured to execute print,
the apparatus comprising:
an execution unit configured to execute a service for communicating with an external service which manages data to be uploaded in an external apparatus; and
a web browser configured to display an operation screen on an operation unit, the operation screen being generated by a web application,
the method comprising:
acquiring the data managed by the external service;
acquiring a format of the data acquired by the reading unit;
acquiring a format of the data which can be printed from the print unit;
controlling display on the web browser to display on the operation screen a name of data whose format matches to the acquired format of the data acquired in the reading unit or the acquired format of the data that can be printed by the print unit,
wherein the format determines whether the data can be uploaded from the external apparatus, and
wherein the web application determines whether the format of the name of data matches the format of the data acquired in the reading unit or the format of printable data in the print unit;
performing control to display on the operation screen a download button for a user to instruct download of the data from the external apparatus by associating with a name of the data whose format matches that of the printable data, among the data pieces whose names are displayed on the operation screen; and
receiving an instruction to download data according to a user's operation of the download button and, if a size of data with the name associated with the download button exceeds a size of data which can be printed from the web browser, performing control to display on the operation screen that print cannot be executed.

4. The method according to claim 3, further comprising performing control to display on the operation screen a print button for a user to instruct printing of the data by associating a name of the data whose format matches that of the printable data and which has been downloaded from the external apparatus, among the data pieces whose names are displayed on the operation screen.

5. A non-transitory computer recording medium recording a program for causing an apparatus to execute the method according to claim 3,
wherein the method further comprises performing control to display on the operation screen a download button for a user to instruct download of the data from the external apparatus by associating with a name of the data whose format matches that of the printable data, among the data pieces whose names are displayed on the operation screen, and
wherein the method further comprises receiving an instruction to download data according to a user's operation of the download button and, if a size of data with the name associated with the download button exceeds a size of data which can be printed from the web browser, performing control to display on the operation screen that print cannot be executed.

6. The non-transitory computer recording medium according to claim 5, wherein the method further comprises performing control to display on the operation screen a print button for a user to instruct printing of the data by associating a name of the data whose format matches that of the printable data and which has been downloaded from the external apparatus, among the data pieces whose names are displayed on the operation screen.

* * * * *